United States Patent Office 3,567,727
Patented Mar. 2, 1971

3,567,727
6-(4-ALKYLPIPERAZIN-1-YL)PHENANTHRIDINES
Harry James Barber, Romford, Essex, and David Henry Jones, Rayleigh, Essex, England, assignors to May & Baker Limited
No Drawing. Filed Oct. 10, 1968, Ser. No. 767,060
Claims priority, application Great Britain, Oct. 11, 1967, 46,496/67
Int. Cl. C07d 51/70
U.S. Cl. 260—268                                 5 Claims

ABSTRACT OF THE DISCLOSURE 6-(4-alkylpiperazin-1-yl)phenanthridines in which the alkyl group contains from one to six carbon atoms, and their non-toxic salts are active on the central nervous system as antidepressants and muscle-relaxants. They may be administered orally to an adult in a dose of, e.g., 50 to 500 mg. per day.

---

This invention relates to new phenanthridine derivatives, to processes for their preparation, and to pharmaceutical compositions containing them.

According to the present invention there are provided the new 6-piperazinylphenanthridine derivatives of the general formula:

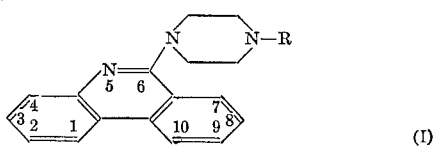

wherein R represents a straight- or branched-chain alkyl group containing from one to six carbon atoms, and acid addition salts thereof.

The aforesaid compounds have interesting pharmacodynamic properties. In particular, they are active on the central nervous system as antidepressants and muscle-relaxants. In addition, the compound of Formula I wherein R represents a methyl group possesses anticonvulsant activity. In the usual tests, the compounds of Formula I show an antidepressant action in rats at doses of 10 to 100 mg./kg. animal body weight by oral and subcutaneous administration and in rabbits at doses of 10 to 100 mg./kg. animal body weight by intra-venous administration and a muscle-relaxant action in the decerebrate and chloralose-anaesthetized cat at doses of 3 to 5 mg./kg. animal body weight by intra-venous administration. The compounds of Formula I wherein R represents a methyl group shows anticonvulsant activity in rats at a dose of 100 mg./kg. animal body weight by oral administration. In the aforementioned tests the compounds did not give rise to any acute side effects at the doses in question. Acute toxicity studies have shown that the $LD_{50}$ values in the mouse of the compounds are greater than 200 mg./kg. animal body weight by oral administration. Preferred compounds are those of Formula I wherein R represents an alkyl group of from one to four carbon atoms, the compound of Formula I wherein R represents a methyl group, i.e. 6-(4-methylpiperazin-1-yl)phenanthridine and its acid addition salts, being particularly preferred.

According to features of this invention, the compounds of general Formula I are prepared by the following methods:

(a) By the reaction of a 6-substituted phenanthridine of the general formula:

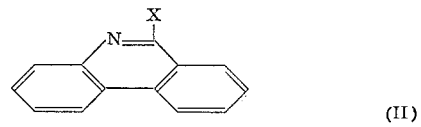

wherein X represents the acid residue of a reactive ester, such as a halogen atom or a sulphuric or sulphonic ester residue, with a 1-alkylpiperazine of the general formula:

wherein R is as hereinbefore defined. The reaction is preferably effected by heating the reactants, optionally in an inert solvent such as a ketone, e.g. acetone, a benzene hydrocarbon or a halogenated hydrocarbon, in the presence of an acid binding agent which is conveniently an excess of the piperazine derivative of general Formula III.

(b) By the alkylation by known methods of the nitrogen atom of the piperazinyl ring of 6-piperazin-1'-yl-phenanthridine, e.g. with an alkylating agent of the general formula RX, wherein R and X are as hereinbefore defined, or by the reduction of a compound of the general formula:

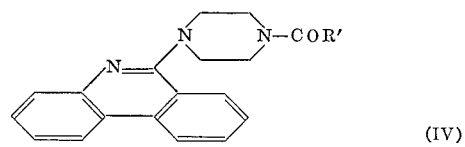

wherein R' represents a straight- or branched-chain alkyl group containing from one to five carbon atoms. Reaction of 6-piperazinyl-1'-yl-phenanthridine with the compound RX may be effected by heating the reactants in an inert solvent such as a ketone, e.g. acetone, a benzene hydrocarbon or a halogenated hydrocarbon, in the presence of an acid-binding agent, e.g. an alkali metal or derivative thereof such as an alkali metal carbonate, alkoxide, amide or hydride, or a tertiary base such as pyridine. Reduction of the compounds of general Formula IV may be effected by known methods for reducing the carbonyl group of an amide to a methylene (i.e. $-CH_2-$) group, e.g. with lithium aluminium hydride in an inert solvent such as an ether, e.g. diethyl ether.

The 6-piperazin-1'-yl-phenanthridine starting material may be prepared by the reaction of 6-chlorophenanthridine (described by G. M. Badger, J. M. Seidler, and B. Thomsen, J. Chem. Soc., 1951, 2310) with piperazine, preferably using the reaction conditions as set forth in connection with (a) above.

The compounds of general Formula IV may be prepared by the reaction of 6-piperazin-1'-yl-phenanthridine with an acid halide of the general formula R'CO—Hal, wherein R' is as hereinbefore defined and Hal represents a halogen atom, e.g. a chlorine atom. The reaction may be effected as hereinbefore set forth for the reaction of 6-piperazin-1'-yl-phenanthridine with the compound RX.

(c) By the reaction of 6-aminophenanthridine (described by G. T. Morgan and L. P. Walls, J. Chem. Soc., 1932, 2225) with a compound of the general formula:

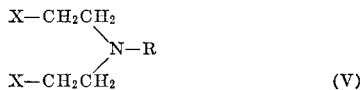

wherein R and X are as hereinbefore defined. The reaction may be effected in the presence or absence of an acid binding agent, for example as set forth in connection with (b) above.

(d) By the reaction of a compound of the general formula:

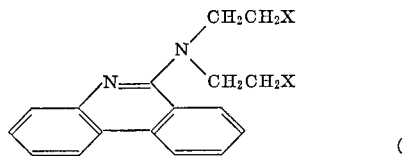

wherein X is as hereinbefore defined, with an amine of the general formula $RNH_2$, wherein R is as hereinbefore defined. The reaction may be effected in the presence or absence of a solvent, and in the presence or absence of an acid binding agent, for example as set forth in connection with (b) above.

The starting materials of Formula VI may be prepared by the action of ethylene oxide on 6-aminophenanthridine to give 6 - [(bis-2-hydroxyethyl(amino]phenanthridine, which is then treated, by known methods for the preparation of reactive esters from hydroxy compounds to give a compound of the general Formula VI.

By the term "known methods" as used in this specification and accompanying claims is meant methods heretofore used or described in the chemical literature.

When the phenanthridine derivatives of general Formula I are used for therapeutic purposes in the form of salts, it should be understood that only those such salts should in practice be employed as contain anions or radicals that are relatively innocuous to the animal organism when used in therapeutic doses so that the beneficial physiological properties inherent in the parent compound are not vitiated by side-effects ascribable to those anions or radicals; in other words, only non-toxic salts are contemplated. Suitable acid addition salts include hydrohalides (for example hydrochlorides and hydrobromides), phosphates, nitrates, sulphates, maleates, fumarates, citrates, tartrates, embonates, methane sulphonates and ethane disulphonates. These salts may be made from the bases of general Formula I by the methods heretofore used in the art for making acid addition salts. For example, the acid addition salts may be made by mixing the required base with one or two equivalents of a non-toxic acid in a solvent and isolating the resultant salt by filtration after, if necessary, evaporation of part or all of the solvent. They may be purified by crystallisation or by any other method commonly used in the art.

The following examples illustrate the preparation of the compounds of this invention.

EXAMPLE I

A mixture of 6-chlorophenanthridine (10.0 g.; prepared according to G. M. Badger, J. M. Seidler, and B. Thomsen, J. Chem. Soc., 1951, 2310), and N-methylpiperazine (11.5 ml.) was heated on the steam bath for four hours. The mixture was cooled, treated with 2 N sodium hydroxide solution (50 ml.) and extracted with diethyl ether (3×75 ml.). The ethereal solution was dried over magnesium sulphate and evaporated in vacuo. The residue was distilled to give 6-(4-methylpiperazin-1-yl)phenanthridine (11.0 g.), B.P. 205–210° C./0.5 mm. Hg.

A sample of this base was dissolved in methanol and treated with methanolic hydrogen bromide to give 6-(4-methylpiperazin - 1 - yl)-phenanthridine dihydrobromide, M.P. 289–292° C., with decomposition.

Similarly prepared was 6 - (4-methylpiperazin-1-yl)-phenanthridine dihydrochloride, M.P. 255–258° C., with decomposition.

EXAMPLE II

A mixture of 6-chlorophenanthridine (3.86 g.) and N-ethylpiperazine (2.0 g.) was heated in an oil bath to 125–130° C. for 4 hours. The cooled mixture was dissolved in hot ethanol, poured into 2 N sodium hydroxide solution (100 ml.) and the ethanol was distilled off under reduced pressure. The residue was extracted with diethyl ether and the ether solution was shaken with an excess of 3 N hydrochloric acid. The acidic solution was evaporated to dryness to give 6-(4-ethylpiperazin-1-yl)phenanthridine dihydrochloride trihydrate (1.25 g.), M.P. 266–268° C., with decomposition.

EXAMPLE III

Proceeding as described in Example II but starting with 6-chlorophenanthridine (3.1 g.) and N-isobutylpiperazine (2.0 g.), there was obtained 6-(4-isobutylpiperazin-1-yl) phenanthridine dihydrochloride trihydrate (1.32 g.), M.P. 144–146° C., with decomposition.

The present invention further includes within its scope pharmaceutical compositions which comprise at least one phenanthridine derivative of general Formula I, or a non-toxic acid addition salt thereof, in association with a pharmaceutical carrier. The invention includes especially such compositions made up for oral parenteral or rectal administration. In clinical practice the compounds of the present invention will normally be administered orally so that compositions suitable for oral administration are preferred.

Solid compositions for oral administration include compressed tablets, pills, dispersible powders and granules. In such solid compositions one or more of the active substances is or are admixed with at least one inert diluent such as calcium carbonate, potato starch, alginic acid, or lactone. The compositions may also comprise, as is normal practice, additional substances other than inert diluents, e.g. lubricating agents such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention for oral administration also include capsules of absorbable material such as gelatin containing one or more of the active substances with or without the addition of diluents or excipients.

Preparations according to the invention for parenteral administration include sterile aqueous or non-aqueous solutions, suspensions, or emulsions. Examples of suitable non-aqueous media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The compositions for rectal administration are suppositories which contain, in addition to the active substance, excipients such as cacao butter or suppository wax.

The percentage of active ingredient in the compositions of the invention may be varied, it being necessary that it should constitute a proportion such that a suitable dosage shall be obtained. Obviously several unit dosage forms may be administered at about the same time. In general, the preparations of the present invention should normally contain at least 0.025% by weight of active substance in the case of injectable solutions and at least 0.1% by weight of such substance in the case of oral preparations. The dose employed depends upon the desired therapeutic effect, the route of administration and the duration of the treatment. When orally administered, generally between 50 and 500 mg. per day of active product is administered to an adult.

The following example illustrates pharmaceutical compositions according to the present invention.

EXAMPLE IV

Tablets of the formula:

| | Mg. |
|---|---|
| 6-(4 - methylpiperazin-1-yl)phenanthridine dihydrochloride | 10 |
| Lactose | 49.5 |
| Starch | 20 |
| Dextrin | 20 |
| Magnesium stearate | 0.5 | were prepared by intimately mixing the phenanthridine derivative, lactose, starch and dextrin, and passing the mixture through a 60-mesh British Standard sieve. After addition of the magnesium stearate, the mixture was granulated to a suitable size and the granules compressed to form tablets.

Instead of the phenanthridine derivative specified in the above formulation, any other phenanthridine derivative within the scope of general Formula I and non-toxic acid addition salts thereof, e.g. those obtained as products in Examples II and III, may be employed.

We claim:

1. Phenanthridine derivatives of the formula:

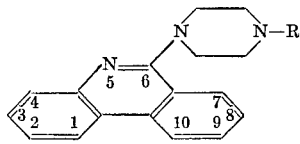

wherein R is alkyl of one through six carbon atoms, and non-toxic acid addition salts thereof.

2. Phenanthridine compounds according to claim 1 wherein R is alkyl of one through four carbon atoms.

3. 6-(4 - methylpiperazin-1-yl)phenanthridine and non-toxic acid addition salts thereof.

4. 6 - (4 - ethylpiperazin-1-yl)phenanthridine and non-toxic acid addition salts thereof.

5. 6 - (4 - isobutylpiperazin-1-yl)phenanthridine and non-toxic acid addition salts thereof.

References Cited

UNITED STATES PATENTS 3,331,843   7/1967   Tomcufcick et al. ____ 260—268

DONALD G. DAUS, Primary Examiner

U.S. Cl. X.R.

260—283; 424—250